(No Model.)  M. A. LASKA.  2 Sheets—Sheet 1.
AUTOMATIC WATER WORKS.

No. 336,327.  Patented Feb. 16, 1886.

WITNESSES:
Otto Beyer
C. Sedgwick

INVENTOR:
M. A. Laska
BY Munn & Co
ATTORNEYS.

N. PETERS, Photo-Lithographer, Washington, D. C.

(No Model.) 2 Sheets—Sheet 2.

M. A. LASKA.
AUTOMATIC WATER WORKS.

No. 336,327. Patented Feb. 16, 1886.

WITNESSES:

INVENTOR:
M. A. Laska
BY Munn & Co.
ATTORNEYS.

UNITED STATES PATENT OFFICE.

MATHIAS A. LASKA, OF NEW ORLEANS, LOUISIANA.

AUTOMATIC WATER-WORKS.

SPECIFICATION forming part of Letters Patent No. 336,327, dated February 16, 1886.

Application filed September 19, 1885. Serial No. 177,563. (No model.)

*To all whom it may concern:*

Be it known that I, MATHIAS A. LASKA, of New Orleans, in the parish of Orleans and State of Louisiana, have invented a new and useful Improvement in Automatic Water-Works, of which the following is a full, clear, and exact description.

The object of my invention is to provide new and improved water-works for automatically raising and delivering water without the use of a motor or other power machinery.

The invention consists in the special combinations of pipes and other pieces, as will be fully described and set forth hereinafter, and pointed out in the claims.

Reference is to be had to the accompanying drawings, forming a part of this specification, in which similar letters of reference indicate corresponding parts in all the figures.

Figure 1:
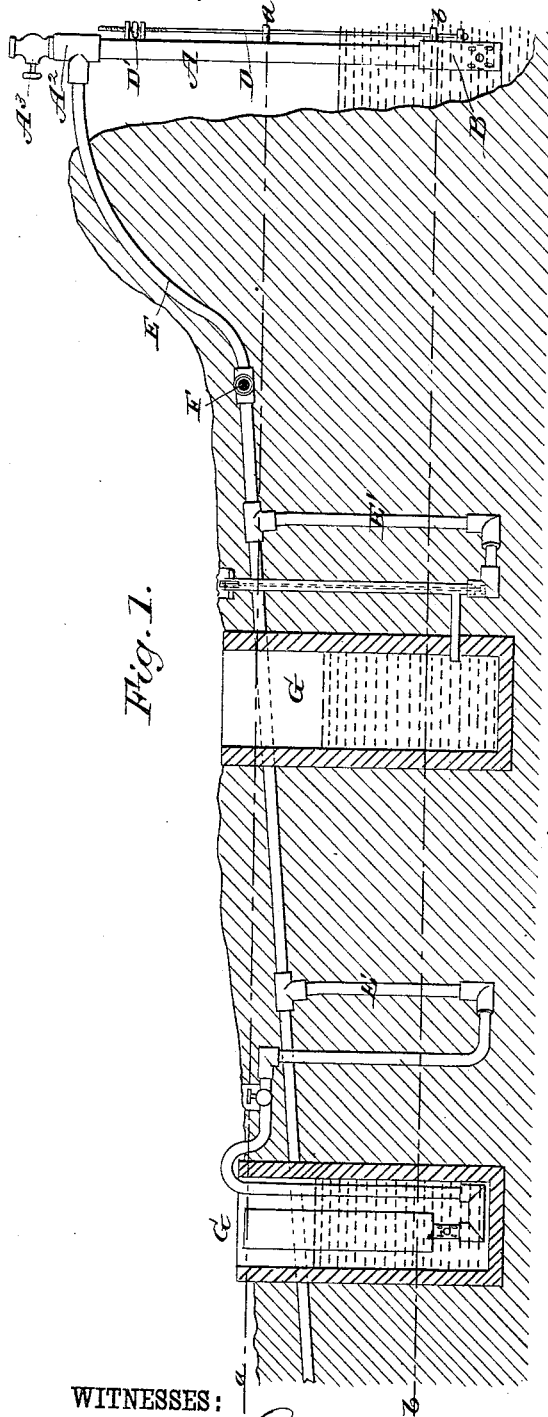
Figure 2:
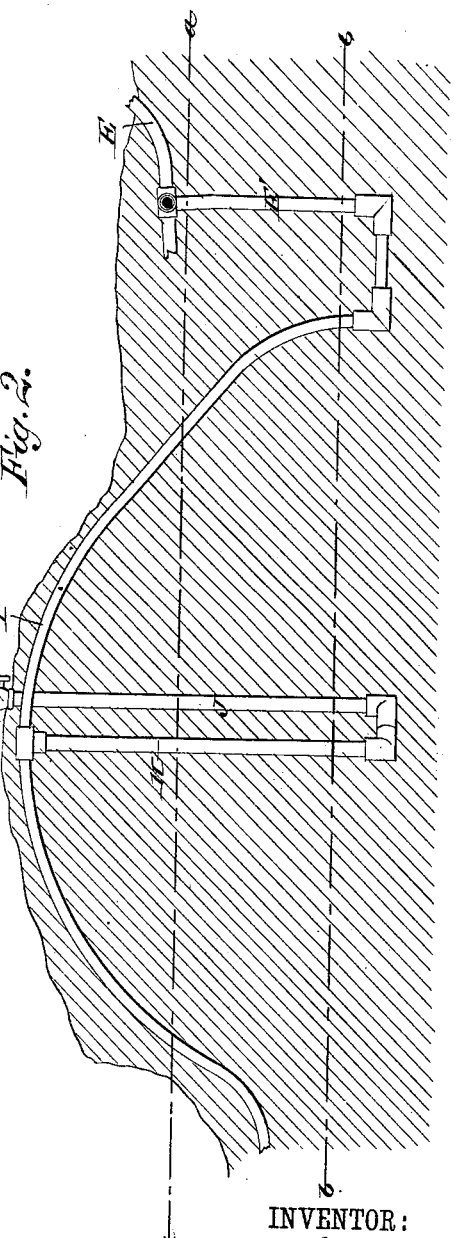
Figure 3:
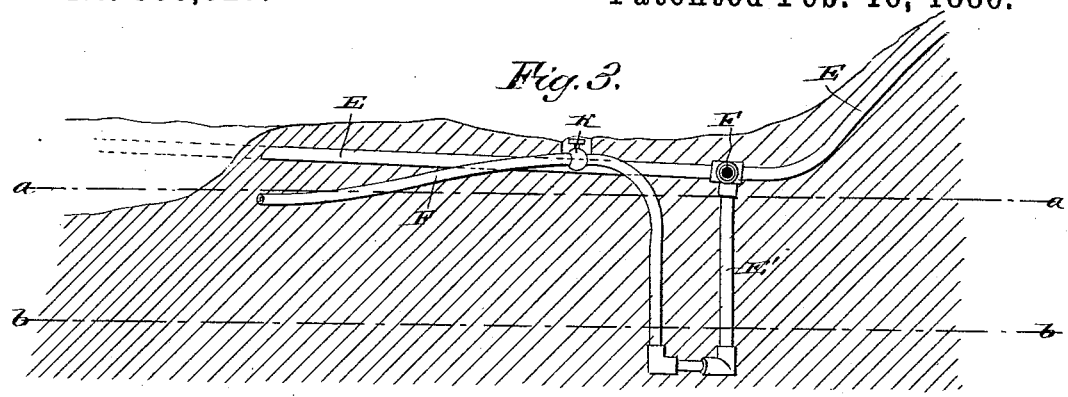
Figure 4:
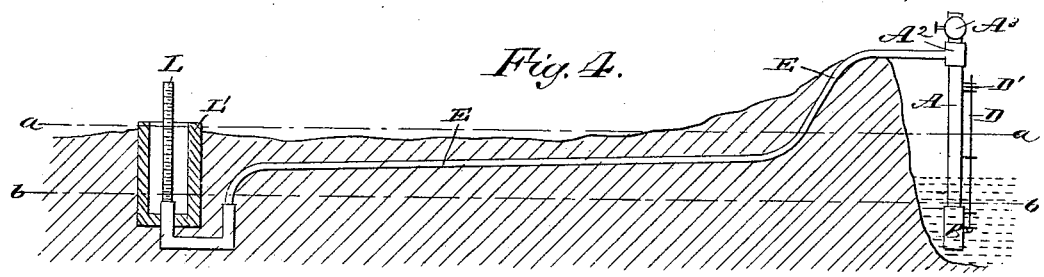
Figure 6:
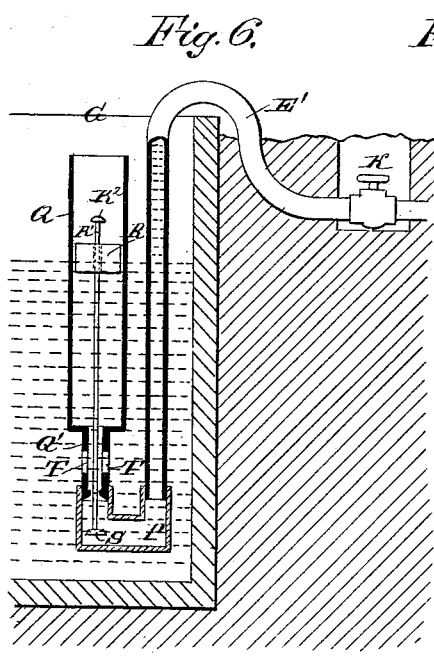
Figures 5, 7:
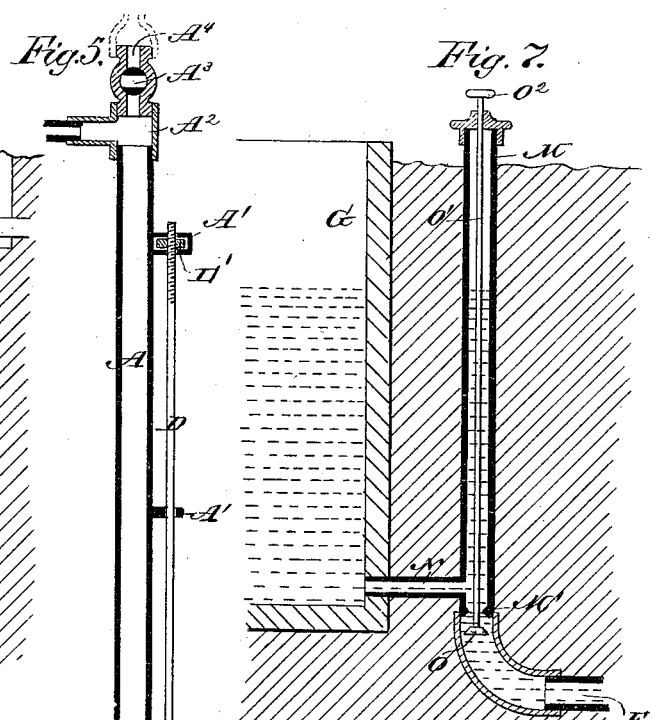

Figure 1 represents my improved automatic water-works made new. Fig. 2 shows the manner of conveying pipes over hills. Fig. 3 shows the connection of branch pipes. Fig. 4 shows the gage-tube. Fig. 5 is a detail longitudinal sectional view of the stand-pipe and its valves. Fig. 6 is a detail longitudinal sectional view of a cistern and the valves. Fig. 7 is a detail longitudinal sectional view of the valve for regulating the flow of water into cisterns.

In all the figures $a\ a$ represent the high-water level, and $b\ b$ the low-water level. The stand-pipe or siphon-pipe A is held vertically, and is dipped into the water in river, bay, &c., to a point below the low-water mark, and the lower end of the stand-pipe is passed into a cylindrical cup, B, having a closed bottom, B', on which a packing-piece, C, rests. The said cup is also provided with numerous apertures and with lugs C', through which a rod, D, passes, which also passes through guide-lugs A' on the pipe A. The upper end of the said rod D is screw-threaded and passed through a nut, D', held between lugs on the pipe A. On the upper end of the pipe A the casing $A^2$ is secured, with which the main water-conducting pipe E is connected. A cock, $A^3$, is formed on the casing $A^2$, and above it a neck, $A^4$, for attaching a tube or hose is provided.

The main pipe E is conducted under ground in the desired direction, and with the same numerous branch pipes, F, are connected, which branch pipes conduct the water into tanks or cisterns G greater or less distances from the main pipe. The bottom of each cistern must be below the low-water mark $b\ b$, and the delivery-pipe F must enter the cistern below the low-water line, as shown in Fig. 7; or, if it enters at the top, it must extend down below the low-water line, as shown on Fig. 6. In all cases the branch pipes F must be carried down below the low-water line $b\ b$ at the main pipe E by a pipe, E', or otherwise.

Where a pipe is carried over an elevation, as shown on Fig. 2, it must be carried below the low-water line at both ends of said bend, and a pipe, H, must extend from the highest point of the bend I down below the lower-water line, and from the lowest point of said pipe H a pipe, J, must be extended up above the surface of the earth and provided with a cock, J'. Each branch pipe F may have a cock, K, as shown in Fig. 3, if desired. The inner end of the main pipe E is connected with a vertical glass gage-tube, L, in a cistern or inclosure, L'.

At the wells G a pipe, M, extending to the surface of the earth, is connected with each pipe E', and from the lower end of the pipe M a small pipe, N, conducts the water into the cistern G at the bottom of the same. Below the pipe N a valve-vent, M', is formed in the pipe M for a valve, O, secured to a rod, O', projecting up through the pipe N and received through the cover of the pipe N, the said rod having a hand-wheel, $O^2$, on its upper end.

Where the pipe F enters the top of the cistern it is carried down in the cistern below the low-water line and connected with a U-shaped pipe, P, on the other end of which the neck Q' is placed, which projects down from a cylinder, Q, containing the float R, mounted loosely on the vertical rod R', having a head, $R^2$, on its upper end, and having its lower end connected with the valve S, which fits on a valve-vent formed on the lower end of the neck Q'. The neck Q' has apertures T.

The operation is as follows: The air is exhausted from the pipe A, and the other pipes or all the pipes are filled with water forced into the pipe A through a hose connected with the neck of the casing A². This starts the siphon and the water runs into all the cisterns until the level in said cisterns is equal to the level of the water in the river, pond, &c. In case any cistern is to be cut out its valve O is closed. In case the level of the water in the river rises to such height as to flood the country, the floats R rise in the cylinder Q, strike the head R², raise the rod R' and the valve S, thus shutting off the water.

The pipes must all be carried below the low-water line, so that the water can circulate in the pipes when there is low water in the river, and to prevent the air from the several pipes all passing into the main pipe and accumulating at the top of the pipe A, which would put the siphon out of operation.

The pipes may be extended any desired distance, and may be of any desired capacity, and the number of cisterns and size of the same may be increased or decreased, as may be desired.

The pipes H are provided to withdraw the air from the top of the bend I.

The cup B serves as a strainer, and can also be used to close the lower end of the standpipe when the apparatus is to be put out of operation.

The high-water mark may be a greater or less distance from the top of the levee, and need not necessarily be the distance from said top shown in the drawings.

I am aware that a siphon has been extended near the bottom of a reservoir and provided with a bend between its receiving and delivery end extending below the receiving end, and with a vertical tube extending from the siphon at the forward arm of said bend, and provided with a faucet, and I do not claim the same as of my invention.

Having thus described my invention, I claim as new and desire to secure by Letters Patent—

1. The combination, with a siphon-tube, of a conducting-pipe connected with the same, which conducting-tube has a bend, a tube extending from the bend down below the low-water line, and a pipe extending from the lower end of such tube up to the surface of the earth, substantially as herein shown and described.

2. The combination, with a siphon-tube, of a conducting-tube having one end connected with said tube, and having a vertical gage-tube on the other end, the said gage-tube being in a suitable receptacle, substantially as herein shown and described.

3. The combination, with a siphon-tube, of a water-conducting pipe connected with the same, a cistern into which the water-conducting pipe passes from the top downward, a cylinder in the cistern and on the end of the water-conducting pipe, a float in said tube, and a valve in the water-conducting pipe, the valve being on a rod operated by the float, substantially as herein shown and described.

MATHIAS A. LASKA.

Witnesses:
THEODOR VOIGT,
M. T. DUCROS.